Feb. 4, 1969  R. J. CLARK  3,426,344
CHARACTER GENERATOR FOR SIMULTANEOUS DISPLAY
OF SEPARATE CHARACTER PATTERNS ON
A PLURALITY OF DISPLAY DEVICES
Filed March 23, 1966

INVENTOR.
ROBERT J. CLARK
BY John T. O'Halloran
Attorney

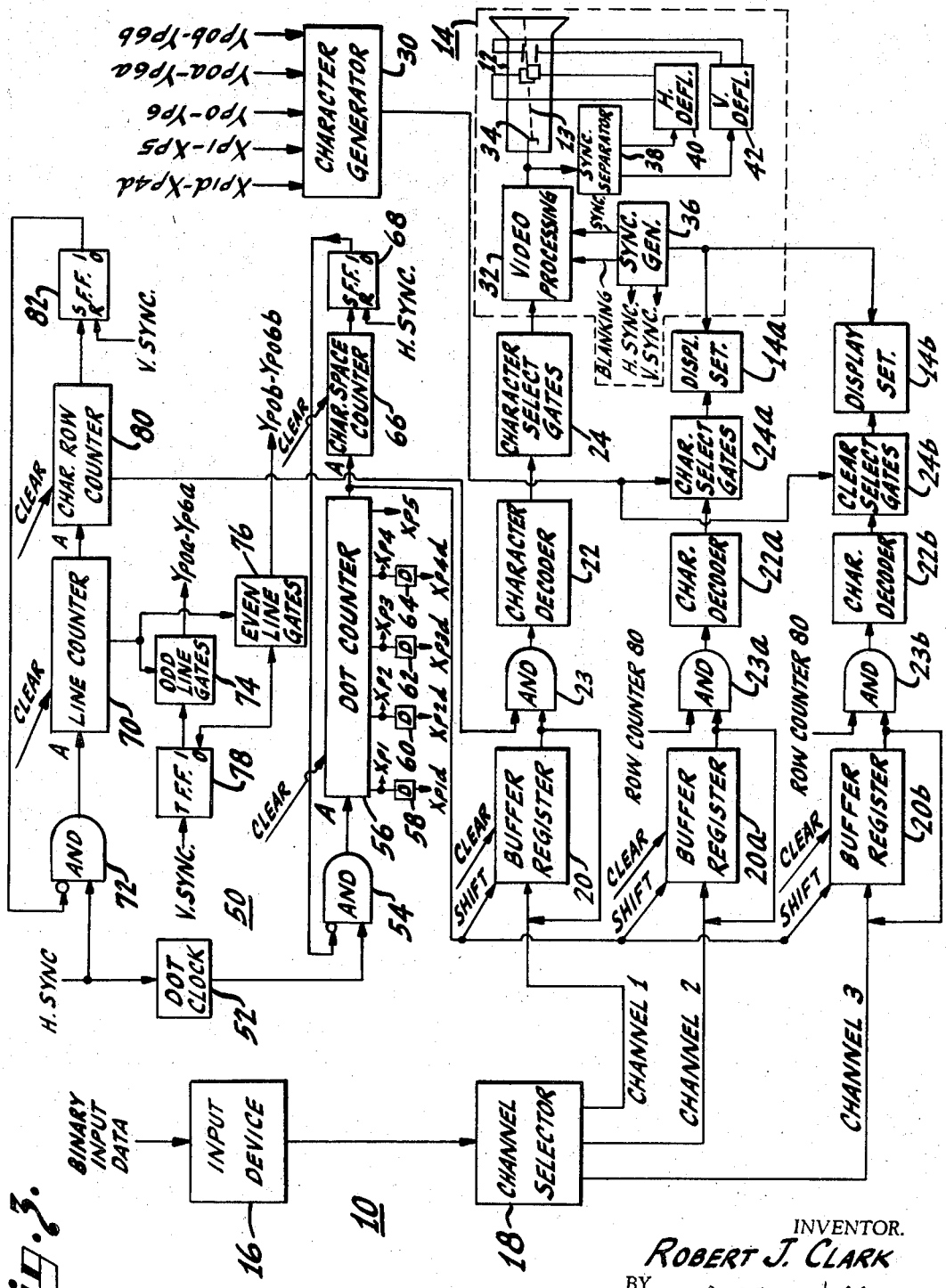

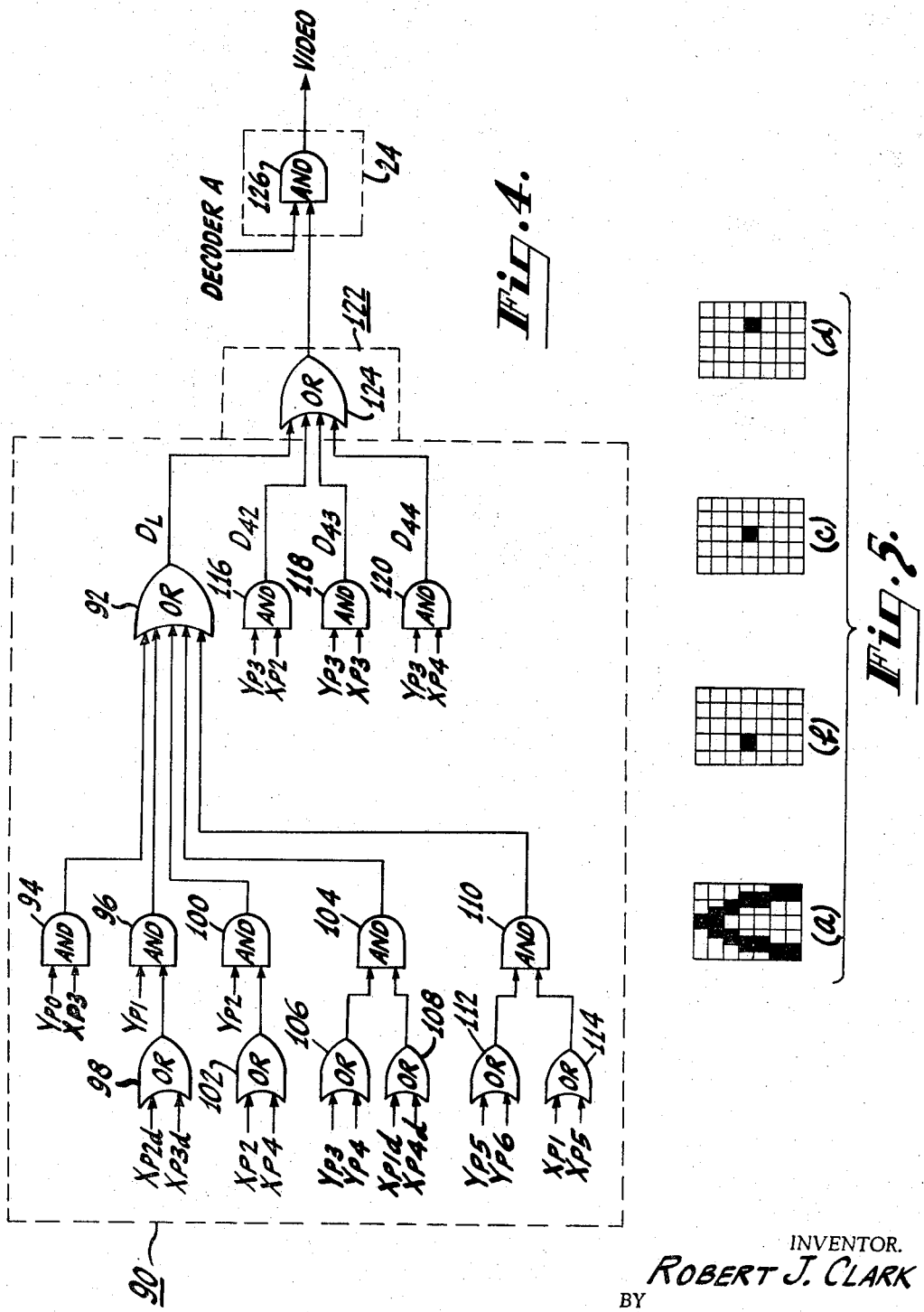

$D_A = [YP0 \cdot XP1] + [YP1_a \cdot XP1_d] + [YP1_b \cdot XP2] + [YP2 \cdot XP2_d]$ $D_B = [YP0 \cdot XP5] + [YP1_a \cdot XP4_d] + [YP1_b \cdot XP4] + [YP2 \cdot XP3_d] + [YP3 \cdot XP3]$ $D_C = [YP3 \cdot XP3] + [YP4 \cdot XP3_d] + [YP5_a \cdot XP4] + [YP5_b \cdot XP4_d] + [YP6 \cdot XP5]$ $D_D = [YP4 \cdot XP2_d] + [YP5_a \cdot XP2] + [YP5_b \cdot XP1_d] + [YP6 \cdot XP1]$ $D_E = [(YP0 + YP1) \cdot (XP1 + XP5)] + [(YP2 + YP3) \cdot (XP1_d + XP4_d)] + [YP4 \cdot (XP2 + XP4)] + [YP5 \cdot (XP2_d + XP3_d)] + [YP6 \cdot XP3]$ $D_T = [(YP0_a + YP6_b) \cdot (XP2_d + XP3_d)] + [YP0_b + YP6_a) \cdot (XP2 + XP3 + XP4)] + [(YP1 + YP5) \cdot (XP1_d + XP4_d)] + [(YP2 + YP4) \cdot (XP1 + XP5)]$ $D_F = [D_T \cdot (YP0 + YP1 + YP2 + YP3)]$ $D_G = [D_T \cdot (YP5 + YP6 + YP7)]$ $D_U = [YP2_a \cdot (XP1 + XP5)] + [YP2_b \cdot (XP1_d + XP4_d)] + [YP3_a \cdot (XP1_d + XP2 + XP3 + XP4 + XP4_d)] + [YP3_b \cdot (XP2 + XP3 + XP4)]$ $D_W = [YP3_a \cdot (XP2 + XP3 + XP4)] + [YP3_b \cdot (XP1_d + XP2 + XP3 + XP4 + XP4_d)] + [YP4_a \cdot (XP1_d + XP4_d)] + [YP4_b \cdot XP1 + XP5]$ $D_H = [D_U \cdot (XP1 + XP2 + XP3 + XP4)]$ $D_I = [D_W \cdot (XP1 + XP2 + XP3 + XP4)]$ $D_J = [D_U \cdot (XP4 + XP5)]$ $D_K [XY_W \cdot XP3] [D_W \cdot (XP4 + XP5)]$ $D_L = [YP0 \cdot XP5] + [YP1 \cdot (XP1_d + XP3_d)] + [YP2 \cdot (+XP2 + XP4)] + [(YP3 + YP4) \cdot (XP1_d + XP4_d)] + [YP5 + YP6) \cdot (XP1 + XP5)]$ $D_X = [(YP0_a + YP6_b) \cdot (XP2_d + XP3_d)] + [(YP0_b + YP6_a) \cdot (XP1_d + XP2 + 3 + 4 + XP4_d)] + [(YP1_a + YP5_b) \cdot (XP1 + 5 + XP1_d + XP4_d)] + [(YP1_b + YP5_a) \cdot (XP1 + 5)]$ $D_M = [D_F \cdot (YP_0 + YP1 + YP2 + YP3) \cdot (YP5 + YP6 + YP7)]$ $D_N = [D_F \cdot (YP0 + YP1 + YP2 + YP3) \cdot (XP1 + XP2 + XP3 + XP4)]$ $D_{\bar{O}} = [D_F \cdot (YP5 + YP6 + YP6) \cdot (XP4 + XP5)]$ $D_{\bar{P}} = [D_F \cdot (YP5 + YP6 + YP7) \cdot (XP1 + XP2)]$ $D_Q = [D_F \cdot (XP1 + XP5)]$ $D_R = [D_G \cdot (XP4 + XP5)]$

DOT PATTERNS

Fig. 6a.

DOT PATTERNS $D_a = [YP1+YP2+YP3+YP4+YP5] \cdot XP1$ $D_b = [YP0+YP1+YP2+YP3+YP4+YP5+YP6] \cdot XP1$ $D_c = [YP0+YP1+YP2+YP3+YP4+YP5+YP6] \cdot XP3$ $D_d = [XP2+XP3+XP4] \cdot [YP0+YP3]$ $D_e = [XP2+XP3+XP4] \cdot [YP0+YP6]$ $D_c = [XP2+XP3+XP4] \cdot [YP0+YP3+YP6]$ $D_g = [YP1+YP3+YP4+YP5] \cdot XP5$ $D_h = [YP1+YP2+YP3+YP4+YP5] \cdot [XP1+XP5]$ $D_i = [YP0+YP1+YP2+YP3+YP4+YP5+YP6] \cdot [XP1+XP5]$ $D_j = [XP1+XP5] \cdot YP0$ $D_k = [XP1+XP5] \cdot YP6$ $D_l = [XP3 \cdot YP4] + [XP4 \cdot YP5] + [XP5 \cdot YP6]$ $D_m = [XP3 \cdot YP4] + [XP2 \cdot YP5] + [XP1 \cdot YP6]$ $D_n = [XP5 \cdot YP0] + [XP1 \cdot YP1] + [XP3 \cdot YP2]$ $D_o = [XP1 \cdot YP0] + [XP2 \cdot YP1]$ $D_p = [XP1 \cdot YP4] + [XP2 \cdot YP3]$ $D_q = [XP2+XP3+XP4] \cdot [YP3+YP5]$ $D_r = [YP0+YP1 \cdot YP2+YP3+YP4+YP5+YP6] \cdot XP4$ $D_s = [YP0+YP1+YP2+YP3+YP4+YP5+YP6] \cdot XP2$ $D_t = [YP0+YP1+YP2+YP3+YP4+YP5+YP6] \cdot [XP1+XP2+YP3+XP4+XP5]$ $D_u = [YP0+YP1+YP2+YP3] \cdot [XP1+XP5]$ $D_v = [XP2d+XP4)] \cdot XP4$ $D_w = [YP1+YP2] \cdot XP1$ $D_x = [YP1+YP2] \cdot XP5$ $D_y = [YP4+YP5] \cdot XP5$ $D_z = [YP4+YP5] \cdot XP1$

---

$D_{11} = YP0 \cdot XP1$ $D_{12} = YP0 \cdot XP2$ $D_{13} = YP0 \cdot XP3$ $D_{14} = YP0 \cdot XP4$ $D_{15} = YP0 \cdot XP5$ $D_{21} = YP1 \cdot XP1$ $D_{22} = YP1 \cdot XP2$ $D_{23} = YP1 \cdot XP3$ $D_{24} = YP1 \cdot XP4$ $D_{25} = YP1 \cdot XP5$ $D_{31} = YP2 \cdot XP1$ $D_{32} = YP2 \cdot XP2$ $D_{33} = YP2 \cdot XP3$ $D_{34} = YP2 \cdot XP4$ $D_{35} = YP2 \cdot XP5$ $D_{41} = YP3 \cdot XP1$ $D_{42} = YP3 \cdot XP2$ $D_{43} = YP3 \cdot XP3$ $D_{44} = YP3 \cdot XP4$ $D_{45} = YP3 \cdot XP5$ $D_{51} = YP4 \cdot XP1$ $D_{52} = YP4 \cdot XP2$ $D_{53} = YP4 \cdot XP3$ $D_{54} = YP4 \cdot XP4$ $D_{55} = YP4 \cdot XP5$

---

$D_{61} = YP5 \cdot XP1$ $D_{62} = YP5 \cdot XP2$ $D_{63} = YP5 \cdot XP3$ $D_{64} = YP5 \cdot XP4$ $D_{65} = YP5 \cdot XP3$ $D_{71} = YP6 \cdot XP1$ $D_{72} = YP6 \cdot XP2$ $D_{73} = YP6 \cdot XP3$ $D_{74} = YP6 \cdot XP4$ $D_{75} = YP6 \cdot XP5$

*Fig. 6b.*

INVENTOR.
ROBERT J. CLARK
BY
John T. O'Halloran
Attorney

Feb. 4, 1969  R. J. CLARK  3,426,344
CHARACTER GENERATOR FOR SIMULTANEOUS DISPLAY
OF SEPARATE CHARACTER PATTERNS ON
A PLURALITY OF DISPLAY DEVICES
Filed March 23, 1966  Sheet 6 of 6

Fig. 7.

$A = D_L + D_{42} + D_{43} + D_{44}$ $B = D_b + D_{12} + D_{42} + D_{72} + D_M + D_{\bar{o}} + D_j + D_K$ $C = D_F + D_{41} + D_{31} + D_{51} + D_G$ $D = D_b + D_{45} + D_Q + D_R + D_{12} + D_{13} + D_{72} + D_{73}$ $E = D_b + D_F + D_{15} + D_{75}$ $F = D_b + D_L + D_{15}$ $G = D_F + D_G + D_{44} + D_{53} + D_{51} + D_{54}$ $H = D_i + D_{42} + D_{43} + D_{44}$ $I = D_C$ $J = D_G + D_{15} + D_{25} + D_{35} + D_{45}$ $K = D_b + D_B + D_{\bar{C}} + D_D$ $L = D_b + D_K + D_{72} + D_{73} + D_{74}$ $M = D_i + D_A + D_B$ $N = D_i + D_A + D_{\bar{C}}$ $O = D_F + D_G + D_{41} + D_{45}$ $P = D_b + D_M + D_j + D_{12} + D_{42} + D_{43} + D_{13}$ $Q = D_F + D_G + D_{41} + D_{45} + D_{\bar{C}}$ $R = D_b + D_M + D_j + D_{12} + D_{13} + D_{42} + D_{43} + D_{\bar{C}}$ $S = D_M + D_N + D_H + D_K + D_{\bar{o}} + D_{\bar{p}}$ $T = D_C + D_j + D_{12} + D_{14}$ $U = D_h + D_j + D_{\bar{o}} + D_{\bar{p}}$ $V = D_E$ $W = D_i + D_{\bar{C}} + D_O$ $X = D_A + D_B + D_{\bar{C}} + D_D$ $Y = D_A + D_B + D_{53} + D_{63} + D_{73}$ $Z = D_e + D_j + D_k + D_B + D_D$ $1 = D_{12} + D_{72} + D_C + D_{14}$ $2 = D_M + D_V + D_j + D_O + D_{72} + D_{73} + D_{74} + D_{75}$ $3 = D_M + D_N + D_j + D_K + D_{\bar{o}} + D_{\bar{p}}$ $4 = D_g + D_B + D_{61} + D_{62} + D_{63} + D_{64} + D_{75}$ $5 = D_L + D_j + D_W + D_K + D_{\bar{o}} + D_{41} + D_{\bar{p}}$ $6 = D_F + D_G + D_{41} + D_K + D_I$ $7 = D_j + D_B + D_D + D_{12} + D_{13} + D_{14}$ $8 = D_M + D_N + D_{\bar{o}} + D_{\bar{p}} + D_H + D_j + D_I + D_K$ $9 = D_F + D_G + D_{45} + D_H + D_j$ $\$ = D_C + D_M + D_N + D_H + D_K + D_{\bar{o}} + D_{\bar{p}}$ $- = D_{Y_1} + D_{42} + D_{43} + D_{44} + D_{45}$ $. = D_{73}$ $, = D_{63} + D_{73}$ $\mathscr{L} = D_B + D_D + D_{12} + D_{73}$ $\blacksquare = D_t$ $; = D_{63} + D_{73} + D_{23}$ $/ = D_B + D_D$ $: = D_{23} + D_{63}$ $! = D_{13} + D_{23}$ $? = D_M + D_N + D_j + D_{53} + D_{73}$ $\& = D_{\bar{p}} + D_{\bar{C}} + D_{32} + D_{21} + D_M + D_N + D_j + D_I$ $* = D_A + D_B + D_{\bar{C}} + D_D + D_C$

CHARACTER PATTERNS

INVENTOR.
ROBERT J. CLARK
BY
*John T. O'Halloran*
Attorney 3,426,344
CHARACTER GENERATOR FOR SIMULTANEOUS DISPLAY OF SEPARATE CHARACTER PATTERNS ON A PLURALITY OF DISPLAY DEVICES
Robert John Clark, Dorion, Quebec, Canada, assignor to Radio Corporation of America, a corporation of Delaware
Filed Mar. 23, 1966, Ser. No. 536,852
U.S. Cl. 340—324                13 Claims
Int. Cl. G08h 23/00; H01j 29/70

ABSTRACT OF THE DISCLOSURE

A display system is provided that includes a character generator that generates simultaneously the entire alphabet of characters and symbols that are to be displayed on display devices such as television receivers or monitors. The character generator generates a plurality of dot signals for each scanline in a raster type scanning system. Selected groups of dot signals are combined to produce simultaneously a plurality of dot patterns that form portions of a plurality of character patterns. The dot patterns are then combined to form simultaneously all of the character patterns in an alphabet. All of these dynamically formed character patterns are available for display on a plurality of display devices and either the same or different character patterns may be simultaneously displayed on these devices.

BACKGROUND OF THE INVENTION

Display systems that convert binary input signals, corresponding to informational data, into video signals for displaying the data in readable form on a conventional television picture tube have been described in the art heretofore. Such display systems are extremely useful because the informational data can either be broadcast be displayed on standard television receivers or be transmitted over a closed circuit to be displayed on standard television monitors. In either case, the use of a standard television picture tube as the display device renders the display system less costly than it would otherwise be.

The standard scanning raster of the television picture tube is utilized in such systems to produce the displayed characters. The characters may, for example, comprise alpha-numeric symbols and/or other marks. Portions of each scanline in a group of scanlines in the raster are selectively blanked and unblanked so that the scanning beam produces a slice of each character in a row of characters as the scanning beam moves across the display device. Thus, the characters are formed by providing character slices at the proper times so as to build up a complete row of characters at the end of a specific number of scanlines.

To provide the correct video signals, each binary input signal is shifted in sequence to a prescribed position during each scanline. In the prescribed position, each binary input signal is sequentially decoded to provide an identity signal for each character to be displayed. Each identity signal is coupled to activate a different group of logic gates. The activation of the logic gates causes the picture tube to be blanked and unblanked at the proper time to display slices of the corresponding character. The sequencing of the binary input signals causes the correct video signals to be applied to the display device at the proper time in the scanlines.

Inasmuch as such display systems produce only one slice of one character at any one instant of time it is necessary to provide a plurality of digital signal-to-video signal converters for multi-channel display systems. Multichannel displays are extremely useful in many operations as, for example, in airline reservation systems wherein airplane seating reservations for separate flights are displayed on separate display devices simultaneously for the benefit of a reservation clerk. The use of separate digital-to-video converters for each display device renders a multi-channel system extremely expensive because of the complexity of the converters and their consequent high cost.

Accordingly, it is an object of this invention to provide a new and improved display system.

It is another object of this invention to provide a display system that provides inexpensive multi-channel operation because of an improved character pattern generator.

It is therefore another object of this invention to provide a new and improved character pattern generator that generates all the characters to be displayed on a plurality of display devices.

It is a further object of this invention to provide a character generator that functions as a character magazine or bank to make available to a plurality of display devices all the characters that are to be displayed thereon.

It is still a further object of this invention to provide a character pattern generator that produces character patterns by first providing a plurality of dot patterns that are combined in predetermined ways to produce all of the alphanumeric symbols and other marks that are to be displayed.

It is still a further object of this invention to provide a character generator that generates a plurality of dot patterns that are combined into character patterns selected from one or more character fonts.

A display system embodying the invention incorporates therein a character pattern generator that functions as a bank or magazine of character patterns. The character generator generates a plurality of character patterns concurrently so that one or more display devices may select the same or different characters simultaneously from the generator for displaying these characters.

An aspect of the invention is that the character generator first generates a plurality of dot patterns that form portions of the characters to be displayed. The dot patterns are then combined in a preselected manner to form a plurality of complete character patterns.

In one specific embodiment of the invention for displaying character patterns on a display device having a raster type scanning pattern, the display system includes a dot signal generator for generating a plurality of dot signals in repetitive sequences in synchronism with each scanline. The dot signals correspond to elemental spaces or dots on the display device and the sequencing divides the scanlines into character spaces. A line signal generator generates a line signal in synchronism with each scanline and in repetitive sequences so as to divide the raster into character rows. The time occurring during one sequence of dot signals and one sequence of line signals effectively defines a character space area. A plurality of dot and line signals are combined to produce a plurality of dot patterns for each character space area. Each dot pattern forms a portion of a character pattern. Pluralities of dot patterns are combined to form a plurality of character patterns for each character space area. Thus, all of the character patterns that can be displayed are generated for each character space area. Desired character patterns are selected for one or more display devices by decoding digital input signals to determine the desired character patterns to be displayed and utilizing the decoded signal to gate the correct character patterns to the correct display device.

In the drawings:

FIGURE 3 is an overall schematic block diagram of a display system embodying the invention;

FIGURE 4 is a schematic circuit diagram of a portion of the character generator embodied in the display system of FIGURE 1;

FIGURE 5 is a graphical illustration of the dot patterns that are combined to form one character pattern;

FIGURES 6a and 6b are a tabulation of the dot signals that are combined to form specific dot patterns; and, FIGURE 7 is a tabulation of the dot patterns that are combined to form specific character patterns.

Character display

Figure 1:
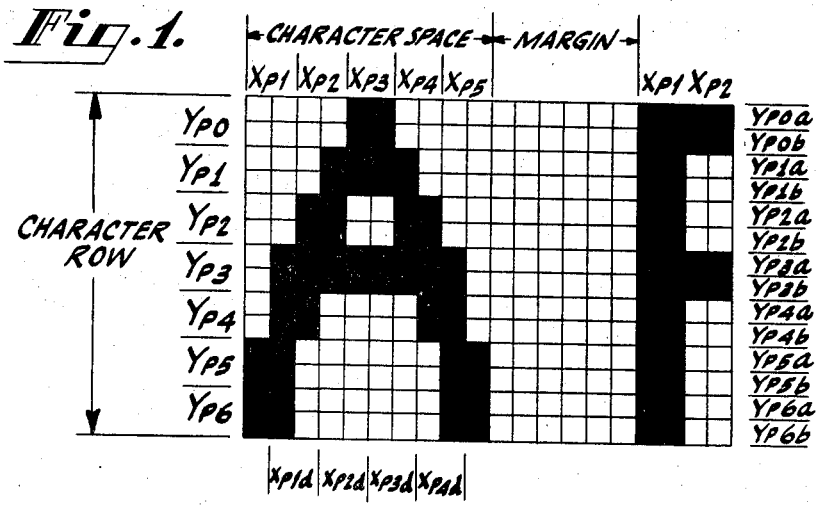
FIGURE 1 is a graphical illustration of the formation of individual character patterns.
Figure 2:
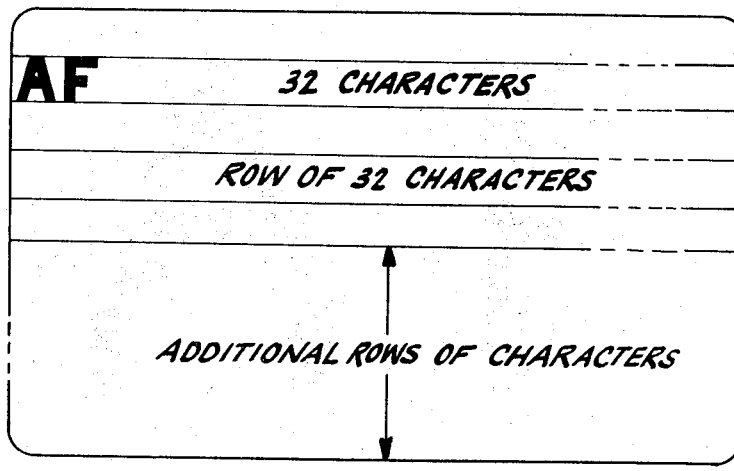
FIGURE 2 is a graphical illustration of the manner in which the character patterns are displayed on the display device.

In FIGURES 1 and 2 there are shown the manner in which character patterns are formed and displayed on a display device. As shown in FIGURE 1, each character pattern is composed of a plurality of dots that are produced by the blanking and unblanking of a scanning beam in a display device. In such a device the dots are, of course, white with the background dark whereas the dots are shown black on a white background in FIGURE 1, for illustrative purposes. The dot spaces in FIGURE 1 are labeled XP1 through XP5 and for convenience this notation is also utilized in the specification to denote the signals that cause dots to be formed in these spaces. It is to be noted that a character, such as A, is five dot spaces wide and is separated by a margin of three dot spaces from the next character. At the beginning of the next character, the dot sequence begins again at XP1 and repeats itself. Thus, in each scanline the dot signals occur in repetitive sequences. The dot spaces labeled XP1d through XP4d are created by delaying the XP1 through XP4 dot signals so as to cause bridging between the dot spaces XP1 through XP5. Such bridging eliminates any voids in the character patterns caused by the failure of the dots XP1–XP5 to overlap.

Scanlines in FIGURE 1 are labeled YP0 through YP6. When the scanlines are interlaced, as in a conventional television raster, the odd scanlines are labeled YP0a through YP6a whereas the even scanlines are labeled YP0b through YP6b. Line signals that correspond in time to the duration of the active trace scan of a scanline are also referenced YP0 through YP6 and either "a" or "b" throughout the specification for convenience. A predetermined number of scanlines YP0 through YP6 form a character row. The sequence YP0 through YP6 may be repeated for a blank space row and then again for the next row of characters. A sequence of scanlines YP0–YP6 in combination with a sequence of dot spaces XP1–XP5 form a character space area.

A character pattern or outline trace is formed in a character space area on a display device by blanking and unblanking the scan signal as the signal traverses the display device. Thus, to form the character A, the scan signal is blanked in scanline YP0 (interlaced scanlines YP0a and YP0b) during the dot spaces XP1, XP2, XP4 and XP5 and unblanked during the dot space XP3. In the remaining scanlines YP1 through YP6 similar blanking and unblanking occurs until the entire character pattern is formed as shown in FIGURE 1 after a predetermined number of scanlines. The retentivity of vision of the eye is relied upon to build up the impression of a complete character from the separate character slices that are produced each scanline similar to the manner in which a picture is built up in television.

FIGURE 2 illustrates how the character patterns appear on the display device in message form. There may, for example, be a top margin between the upper limit of the display device and the first row of characters as well as a blank space between each row of characters. One row of characters may, for example, comprise 32 characters and during each scanline of the row, a slice of each of the 32 characters is displayed.

Detailed description of a display system

Referring now to FIGURE 3, a display system 10 embodying the invention displays character patterns on a display device 12 that may, for example, comprise a conventional picture tube incorporated in a television monitor or display set 14. Although the invention will be described as embodied in a display system as shown in FIGURE 3, it is to be noted that the invention is not limited to such display devices as will be shown subsequently. Information to be displayed on the display device 12 is received by an input device or circuit 16 in binary form. The binary input data may, for example, be derived from a punched paper tape and in such case the input device 16 comprises a tape reader. Alternatively, the input device 16 may be any one of a plurality of other devices such as a computer, and in such a case, the binary data is stored in the memory thereof.

Display channels

Each binary input character is applied from the input device 16 through a channel selector 18 to one of a plurality of channels in the display system 10. Three channels are shown in FIGURE 3 but it is to be understood that more or less channels may be utilized in practicing the invention. Each of the three channels incorporates the same equipment so that only the topmost or first channel is described in detail. Corresponding equipment in the second and third channels are given the same reference numbers as the first channel with an "a" or a "b" appended thereto. The channel selector 18 gates the binary data from the device 16 into a buffer register 20 in the first channel. The buffer register 20 comprises a multilevel shift register having a plurality of serially coupled flip-flop stages for storing the binary coded signals in parallel form. Each character to be displayed on the display device 12 may, for example, comprise a six-bit binary code. Such a code is sufficient to display all the alphanumeric symbols as well as punctuation and other marks. With a six-bit code, the buffer register 20 comprises six parallel levels of stages. The number of characters to be displayed on the display device 12 determines the number of serial stages in the buffer register 20. It is assumed that 32 characters are to be displayed across one character row of the display device 12 and therefore 32 six-level stages are provided in the buffer register 20. When more than one row of characters is to be displayed on the display device the characters in the other rows may be stored in a core memory (not shown) and then read into the buffer registers one row at a time. The last multi-level stage of the register 20 is coupled back to the first stage thereof so that each separate binary code is positioned in the output stage of the register 20 once every sixteen shift pulses. Each shift pulse simultaneously shifts the sixteen binary codes in the register 20 one stage in synchronism with the scanning beam 13 in the display device 12.

The binary code stored in the last stage of the buffer register 20 is applied to a character decoder 22 through AND gates 23. There is one AND gate 23 for each of the six levels of the buffer register 20. The character decoder 22 comprises, for example, a diode matrix which converts each six-bit binary code in the buffer register 20 into a different signal corresponding to an alphanumeric symbol or other mark. The decoded signals from the character decoder 22, corresponding to the different characters, are each applied separately to one of a plurality of character select gates 24. The other input to each of the character select gates 24 comprises a corresponding character pattern signal generated by a character generator 30, to be described in greater detail subsequently. The character pattern signals selected by the character select gates 24 are amplified and processed in a video processing circuit 32 in the display set 14 and applied to the cathode 34 of the display device 12.

A synchronizing (sync) generator 36 provides the vertical and horizontal synchronizing pulses as well as the blanking pulses for the display system 10. The sync generator 36 supplies horizontal sync pulses at the rate of 15,750 per second or one at the beginning of every scanline in an interlaced raster of 525 scanlines. The generator 36 also supplies vertical sync pulses at the rate of 60 per second or one at the beginning of every field of 262½ scanlines. The sync pulses in the video signal are extracted therefrom by a sync separator 38 that suppplies horizontal sync pulses to a horizontal deflection circuit 40 and vertical sync pulses to a vertical deflection circuit 42. The scanning beam 13 is deflected by the electrostatic deflection plates to produce the scanning raster. The sync generator 36 is also coupled to the display sets 14a and 14b in the second and third channels in the display system 10 to insure that all three channels are synchronized. The sync generator 36, the sync separator 38 and the other circuits in the display set 14 are conventional television circuits.

Each of the other two channels in the display system 10 may be identical to the first channel. However, it is to be noted that the buffer registers 20a and 20b may contain a different number of stages than the register 20 if more than one row of characters is to be displayed on these display sets. Depending on the font utilized in the system 10, up to 64 characters can be displayed in one character row and there may be 32 rows of characters displayed. The registers 20, 20a and 20b may contain more or less stages than described depending on the number of characters in a row to be displayed in these channels.

Control circuits

The character patterns to be displayed on the display device 12 are generated in synchronism with the scanning raster of the device 12 by utilizing a control circuit 50. The control circuit 50 includes a pulse generator or dot clock 52 which is synchronized to the display device 12 by horizontal sync pulses applied from the sync generator 36. The dot clock 52 produces a plurality of pulses for each scanline and divides each scanline into a plurality of elemental spaces or dots. To produce 32 character spaces during a typical scanline duration of 50 microseconds requires the dot clock 52 to exhibit a pulse repetition rate of 5.12 pulses per microsecond or a frequency of 5.12 megacycles. The dot pulses produced in the clock 52 are applied to one input of an AND gate 54. The other input to the AND gate 54 is an inhibit input that inhibits the AND gate 54 at the end of a row of characters. The AND gate 54, when enabled, applies the dot pulses to the advance terminal A of a dot counter 56 that functions as a dot signal generator. The dot counter 56 counts each dot pulse and produces, in repetitive sequences, XP1 through XP5 dot signals corresponding to the first five counts in a sequence of eight counts. The XP1 through XP4 dot signals are applied to delay circuits 58, 60, 62 and 64, respectively, to produce delayed dot signals XP1d through XP4d, respectively. At a count of eight, the dot counter 56 produces an output pulse that is coupled to the advance terminal A of a character space counter 66. The output pulse is also applied as a shift pulse to the buffer registers 20, 20a and 20b to shift these registers. The character space counter 66 produces an output at the end of a predetermined number of characters in a scanline. In the assumed embodiment, the counter 66 produces an output after 32 character spaces are counted. The character space counter 66 may, for example, comprise a five-stage binary counter whereas the dot counter 56 may comprise an eight-stage ring counter. Both counters are cleared by a clear pulse at the start of a message to prepare them for the message. When the character space counter 66 counts 32 character spaces, the output signal therefrom is coupled to the set terminal S of a flip-flop 68. The flip-flop 68, when set, produces a signal from the "1" output terminal thereof that is applied to the inhibit terminal of the AND gate 54. The inhibiting of the AND gate 54 prevents the further counting of dot pulses by the dot counter 56. The flip-flop 68 is reset by a horizontal sync pulse generated in the sync generator 36 at the beginning of each scanline.

The control circuit 50 also produces line signals, one for each scanline with each also having a duration equal to one scanline. The control circuit 50 includes a line counter 70 that counts horizontal sync pulses that occur at the beginning of each scanline. The horizontal sync pulses are applied to one input of an AND gate 72 and the other input to the gate 72 is an inhibit input to block the generation of line signals at the end of a field. The line counter 70 generates the line signals YP0 through YP6. For systems utilizing interlaced scanning techniques, odd and even line signals are produced in the odd and even line gates 74 and 76. The odd line gates 74 may, for example, comprise a plurality of AND gates, one for each of the line signals YP0 through YP6 generated in the line counter 70. A separate one of the line signals YP0 through YP6 is applied as one input to each of the gates 74 whereas the other input to each gate is an output signal from the "1" output terminal of a triggerable flip-flop 78. The vertical sync pulse occurring at the beginning of each field is applied to the flip-flop 78 to alternately set and reset the flip-flop 78 at the beginning of each scanning field. The "0" output terminal of the flip-flop 78 is coupled to one input terminal of the even line gates 76 with the other input to each of the gates comprising a separate one of the line signals YP0 through YP6. When set, the flip-flop 78 produces odd line signals YP0a through YP6a and when reset produces interlaced even line signals YP0b through YP6b. At the end of a predetermined sequence of line signals, the line counter 70 generates an output signal that is applied to the advance terminal A of a character row counter 80. For the assumed embodiment, the line counter 70 counts seven scanlines or seven horizontal sync pulses before applying an output signal to the character row counter 80. The character row counter 80 counts the number of rows of characters that are to be displayed on the display device. When the desired number of character rows to be displayed has been counted, the character row counter 80 produces an output signal that is applied to the set terminal S of a flip-flop 82. In the assumed embodiment, the count of one terminal of the character row counter 80 is coupled to the AND gates 23 to activate these gates at the top character row. The flip-flop 82, when set, produces an output signal from the "1" output terminal thereof that is applied to inhibit the AND gate 72 at the end of the desired number of character rows. The flip-flop 82 is reset at the end of every scanning field by a vertical sync pulse from the sync generator 36.

The various dot signals, both direct and delayed, as well as the various line signals, both odd and even, are applied to the character generator 30.

Character generator

The character generator 30 consists of a dot pattern generator and a character pattern generator. Portions of these generators for generating a character pattern for the alphabetic character A are shown in FIGURE 4. The dot pattern generator 90 for the character A comprises a plurality of logic gates that produce various dot patterns. The various dot patterns that are combined to form the character A are shown in FIGURES 5a through 5d and are arbitrarily labeled $D_L$, $D_{42}$, $D_{43}$ and $D_{44}$, respectively. The dot pattern $D_L$ is the major outline portion of the character A. The horizontal crossbar or stroke in the character A is supplied by combining the dot patterns $D_{42}$, $D_{43}$ and $D_{44}$. The dot pattern $D_L$ is derived from an OR gate 92 (FIGURE 4) which effectively combines a plurality of dot signals to produce the dot pattern $D_L$. An AND gate 94 having as inputs thereto a YP0 line signal and an XP3 dot signal provides the topmost or keystone dot of the dot pattern $D_L$. An AND gate 96 combines a YP1 line signal and either an XP2$d$ or an XP3$d$ dot signal from the OR gate 98 to produce a pair of bridging dots for the pattern $D_L$. An AND gate 100 combines a YP2 line signal with either an XP2 or an XP4 dot signal from the OR gate 102 to produce the first separation on either side of the inverted V of the pattern $D_L$. The AND gate 104 continues the separation by combining the dot signals from the OR gates 106 and 108 whereas the AND gate 110 does the same for the OR gates 112 and 114. All of the outputs of the AND gates 94, 96, 100, 104 and 110 are applied to the OR gate 92 to produce the pattern $D_L$.

The dot pattern $D_{42}$ (FIGURE 5b) is produced by an AND gate 116 that combines the line signal YP3 and the dot signal XP2. Similarly, the dot patterns $D_{43}$ and $D_{44}$ are produced by AND gates 118 and 120 that combine the signals YP3 and XP3 and YP3 and XP4, respectively. The other dot pattern produced by the dot pattern generator 90 are defined by the Boolean algebraic equations tabulated in FIGURE 6. From these equations a person skilled in the art may derive both the gates that are to be used to produce the dot patterns as well as the patterns or shapes produced by the gates. It is, of course, apparent that a separate set of gates is not needed for each Boolean equation because different combinations of two sets of gates may produce more than two dot patterns.

The various dot patterns forming the character A are combined in a character pattern generator 122 and specifically in an OR gate 124. The complete character pattern generator 122 is defined by the Boolean algebraic equations tabulated in FIGURE 7.

The character pattern A from the OR gate 124 is coupled to an AND gate 126 in the character select gates circuit 24. The other input to the AND gate 126 is a decoded character A signal from the character decoder 22. Thus, there is an AND gate in the character select gates circuit 24 for every alphanumeric symbol and punctuation and other marks that are to be displayed on the display device 12.

It is to be noted that the use of various dot patterns to produce character patterns permits a large saving in logic gates in providing the character patterns. This is because such alphanumeric characters such as B, E, F, etc. exhibit the same left upright stroke and the same dot pattern is generated only once but used for these different characters. Furthermore, it is also to be noted that the dot pattern method of generating character patterns permits a variety of styles of print from a variety of different type fonts to be displayed on the display device 12. This is because the different elemental dot signals may be combined into any character configuration desired. Additionally, the dot patterns permit information in different type fonts to be displayed on the same or different channels at the same time.

All of the dot patterns and consequently all of the character patterns are generated during each character space area. Such generation permits more than one channel to display the characters since all that is required is the separate gating of the character patterns to each channel.

*Operation*

In describing the operation of the display system 10, it is assumed that each of the channels displays a single row of 32 characters in the top row of the display device 12 after a top margin. It is also assumed that a message that begins with the character A is to be displayed in the first channel of the system 10. By describing in detail the generation of this character, the generation of the other characters and their display in the three channels becomes apparent. Initially, the registers and counters in the display system 10 are cleared by a clear pulse applied to each stage in each counter and register. The binary informational data from the input device is then read into the buffer registers 20, 20$a$ and 20$b$ in sequence. Once the data is stored in the different registers, the system 10 is prepared to display the data.

The dot signals are generated in synchronism with the scanlines produced in the display sets 14, 14$a$ and 14$b$. The vertical sync pulse generated at the beginning of a field of scanlines resets the flip-flop 82 (FIGURE 3) which removes the disabling signal from the AND gate 72. The vertical sync pulse also triggers the flip-flop 78 to produce a signal from the "1" output terminal thereof. The odd line gates 74 are therefore enabled. The horizontal sync pulse resets the flip-flop 68 which enables the AND gate 54.

During the scanning of the top margin of the display device 12, no character patterns are displayed inasmuch as the AND gates 23 block the application of the patterns to the character select gates 24. After the first seven horizontal sync pulses have been counted in the line counter 70, an output pulse is produced that advances the character row counter 80 to a count of one and enables the AND gates 23. The binary code for the character A is positioned in the last stage of the buffer register 20 because this is the first character in the message to be displayed on the display device 12. The binary code for the character A is coupled through the now activated AND gates 23 and decoded in the character decoder 22 to produce a single output denoting the identity of the character. The character identity signal enables the AND gate 126 in the character select gates circuit 24. Thus, the gate 126 is prepared to pass the dot signals that comprise one slice of the character A to the display device 12 when the dot signals are applied thereto. The next horizontal sync signal is counted in the line counter 70 and the counter 70 generates the line signal YP0 whereas the odd line gates 74 generate the odd line signal YP0$a$. The dot pulses from the dot clock 52 are counted in the dot counter 56 to produce the various dot signals. No output is produced at the character generator 30 until the dot signal XP3 activates the AND gate 94 in the dot pattern generator 90 (FIGURE 4). The output pulse from the AND gate 94 is coupled through the OR gate 92 to produce a portion of a dot pattern $D_L$ therefrom. The output pulse is also coupled through the OR gate 124 in the character pattern generator 122 to activate the previously enabled AND gate 126 in the character select gates circuit 24. This pulse is coupled to unblank the cathode 34 of the display device 12 to produce a dot signal (XP3 in scanline YP0$a$) on the display device 12. The odd scanline YP0$a$ does not produce any more dot signals for the character A. At a count of eight dot signals, the dot counter 56 generates an output pulse that advances the character space counter 66 to a count of one. The output pulse also shifts the buffer register 20. The binary code for the character A is therefore shifted from the output stage of the register 20 to the first stage thereof. The binary code for the character F is shifted into the output stage of the buffer register 20 and is decoded to enable a gate in the character select gates 24 corresponding thereto. Therefore, the top slice of the character F is displayed on the display device 12 during the next character space. Similarly, the top slice in the remaining characters in the message are displayed during the rest of the scanline YP0$a$.

At the beginning of the next scanline, the horizontal sync pulse advances the line counter 70 to a count of two and generates a VP1 line signal. The odd line gates 74 generate a YP1$a$ signal. During this scanline the delayed dot signals XP2$d$ and XP3$d$ activate the OR gate 98 and AND gate 96 to produce another portion of the dot signal $D_L$ which is displayed on the device 12. Each succeeding odd scanline produces, in the manner described, a slice of each of the characters in the message to be displayed.

At the end of even odd scanlines, the line counter produces an output signal that recycles the character row counter 80. The AND gates 23 are therefore disabled by the removal of the count of one signal and the gates 23 remain disabled as the scanning beam 13 sweeps down the entire display device. The character row counter 80 also sets the flip-flop 82 and disables the AND gate 72. No character patterns are produced as the scanning beam 13 completes the odd line field.

At the beginning of the even line field, the vertical sync pulse at the beginning of this field resets the flip-flops 78 and 82 and enables the even line gates 76 and the AND gate 72. The odd line gates 74 are disabled. No character patterns are produced during the upper margin because the AND gates 23 remain disabled. When the first seven scanlines produce an output from the line counter 70, the character row counter 80 is shifted to a count of one and enables the AND gates 23.

The line counter 70 on the next scanline generates a YP0 line signal and the gates 76 generate an even line signal YP0b. It is to be noted that YP0b is interlaced between YP0a and YP1a. The even scanlines generate the remaining slices of the characters which are inserted between the slices produced in the odd scanlines. Thus, an entire row of characters are displayed and the retentivity of vision of humans as well as the television scanning rate causes them to appear as if they were generated at one single time.

The other display channels select the character patterns to be displayed in a manner similar to that described for the first channel. As many other channels as desired may be operated from the character generator 30 because the character pattern signals can be amplified to the levels required for such operation.

It is to be noted that the building up of character patterns from a variety of dot patterns is not limited to display systems utilizing television raster type display devices and is also not limited to the dynamic generation of the dot patterns. Dot pattern signals may be stored statically in storage devices as by storing bits in various two-state storage devices such as flip-flops or magnetic cores. The dot patterns are built up by combining the various signals in such storage devices to provide a signal that deflects a beam in a cathode ray tube in a manner to trace the pattern on the tube. A plurality of such dot patterns are combined to produce the character patterns. Such statically stored dot and character patterns effectively provide a bank or magazine of characters in desired fonts that may be used in photocomposing newspapers, books, magazines, etc.

Thus, a display system embodying the invention includes a character pattern generator that permits the system to operate a plurality of channels as well as produce a variety of desired fonts of print.

What is claimed is:

1. A character generator for simultaneously generating a plurality of character patterns for a plurality of display devices, comprising in combination,
    means for providing a plurality of dot signals to produce elemental dots for display on said display devices,
    means for combining selected ones of said dot signals to produce concurrently a plurality of groups of dot patterns that form portions of a plurality of said character patterns, with certain ones of said dot signals being common to a plurality of said groups of dot patterns, and
    means for combining selected groups of said dot patterns to form concurrently a plurality of character patterns with certain groups of said dot patterns being common to a plurality of said character patterns.

2. A display system for displaying characters on a display device, comprising in combination,
    means for dividing said display device into a plurality of character space areas, and
    a character pattern generator for generating a plurality of character patterns for each one of said character space areas,
    said character pattern generator including means for providing a plurality of dot signals to produce elemental dots on said display device,
    means for combining selected ones of said dot signals to provide concurrently a plurality of groups of dot patterns that form portions of a plurality of said character patterns with certain ones of said dot signals being common to a plurality of said groups of dot patterns, and
    means for combining selected groups of dot patterns to form concurrently a plurality of said character patterns with certain groups of said dot patterns being common to a plurality of said character patterns.

3. A display system in accordance with claim 2 that further comprises
    a character select circuit for selecting one of said plurality of character pattern signals for each character space area on said display device to display the characters corresponding thereto in the character space area.

4. A display system in accordance with claim 2 that further comprises
    a storage device for storing in coded form data to be displayed on said display device,
    means for decoding said stored data to provide a decoded signal, and
    means for applying said decoded signal to said character select circuit to select a character pattern signal corresponding to said decoded signal so as to display the corresponding stored data on said display device.

5. A display system in accordance with claim 4 wherein said stored data is stored in said storage device in binary coded form.

6. A display system in accordance with claim 2 wherein said display device comprises a television picture tube.

7. A display system in accordance with claim 2 that further comprises
    a plurality of display channels with each including a display device, and
    means for simultaneously selecting character pattern signals from said generating means for displaying the same and different character patterns on said display devices.

8. A character generator for generating character patterns for a display device, comprising in combination,
    means for generating a plurality of dot signals in sequence to correspond to elemental dots on said display device to divide said display device in a first direction into a plurality of spaces,
    means for generating a plurality of line signals in sequence to divide said display device into a plurality of rows in a second direction,
    means for combining selected dot signals and line signals and line signals to produce a plurality of dot patterns that form portions of a plurality of character patterns with certain dot signals being common to a plurality of dot patterns, and
    means for combining a plurality of selected groups of dot patterns to produce simultaneously a plurality of character patterns for display in said display system with certain groups of said dot patterns being common to a plurality of character patterns.

9. A character generator in accordance with claim 8 wherein said first and second directions are perpendicular to each other.

10. A character generator for generating character patterns for displaying said patterns on a display device that exhibits a raster scanline pattern, comprising in combination,
    means for generating during said scanlines dot signals in repetitive sequences to divide said scanlines into elemental spaces that are grouped into character spaces by said sequencing, means for generating during said scanlines line signals in repetitive sequences to divide said raster into character rows, the combination of said dot signals and said line signals dividing said raster into character space areas, and means for combining selected dot signals and selected line signals to produce a plurality of dot patterns that form portions of said character patterns.

11. A character generator in accordance with claim 10 that further comprises means for combining selected groups of dot patterns to form a plurality of character patterns for display on said display device.

12. A display system for displaying character patterns on a display device that exhibits a television raster scanline pattern, comprising in combination, a dot signal generator for generating during said scanlines a plurality of dot signals that correspond to elemental spaces on said display device, means for counting said dot signals in repetitive sequences to divide said scanlines into character spaces, means for generating during said scanlines line signals in repetitive sequences to divide said raster into character rows, the combination of said dot signals and said line signals dividing said raster into a plurality of character space areas, means for combining selected dot signals and line signals to produce repetitively for each character space area a plurality of dot patterns that form portions of said character patterns, and means for combining selected groups of dot patterns to form simultaneously a plurality of character patterns for each character space area on said display device.

13. A display system in accordance with claim 12 wherein said dot signal generator comprises the combination of an oscillator synchronized to said scanlines for producing a plurality of output pulses, and a counter coupled to count in repetitive sequences the output pulses of said oscillator.

References Cited

UNITED STATES PATENTS

| | | | |
|---|---|---|---|
| 3,017,625 | 1/1962 | Evans et al. | 340—324 |
| 3,165,045 | 1/1965 | Troll | 340—324 |
| 3,305,841 | 2/1967 | Schwartz | 340—324 |
| 3,323,119 | 5/1967 | Barcomb | 340—324 |
| 3,345,458 | 10/1967 | Cole et al. | 340—324 |

JOHN W. CALDWELL, *Primary Examiner.*

A. J. KASPER, *Assistant Examiner.*

U.S. Cl. X.R.

315—18, 22; 178—6.8